Dec. 25, 1951 S. I. TOURSHOU 2,579,627

DEFLECTION SYSTEM

Filed June 22, 1950 2 SHEETS—SHEET 1

INVENTOR
Simeon I. Tourshou
BY
[signature]
ATTORNEY

Dec. 25, 1951 S. I. TOURSHOU 2,579,627

DEFLECTION SYSTEM

Filed June 22, 1950 2 SHEETS—SHEET 2

INVENTOR
Simeon I. Tourshou
BY
[signature]
ATTORNEY

Patented Dec. 25, 1951 2,579,627

UNITED STATES PATENT OFFICE 2,579,627

DEFLECTION SYSTEM

Simeon I. Tourshou, Philadelphia, Pa., assignor to Radio Corporation of America, a corporation of Delaware Application June 22, 1950, Serial No. 169,656

16 Claims. (Cl. 315—27)

The present invention relates to cathode ray beam deflection systems and methods and more particularly although not necessarily exclusively to electromagnetic cathode ray beam deflection circuits of the type employed in television systems.

More directly the present invention relates to width control arrangements for electromagnetic deflection circuits of the television variety and finds particular advantageous application to television type deflection systems of the power recovery, reaction scanning type. In this regard the present invention is especially useful in connection with the direct drive type cathode ray beam deflection system shown and described in another U. S. patent application Ser. No. 90,612, entitled "Television Deflection Power Recovery Circuit" by Simeon I. Tourshou, filed April 30, 1949, issued as Patent No. 2,555,831 on June 5, 1951. Its utility, however, is to be no way construed as limited to such direct drive deflection systems.

In virtually all cathode ray beam deflection systems employed in the electrical art it is desirable that some means be provided for controlling the amplitude of cathode ray beam deflection. It is further desirable that the means used to control the amplitude of deflection be of such a nature as to not adversely affect the wave form of the deflection signal defining the cathode ray beam movement.

In television cathode ray beam deflection systems such an amplitude control is usually referred to as a width or height control. Since the horizontal beam deflection circuits of a television system operate at relatively high frequencies, the circuit constants of the horizontal deflection system are quite critical. Attempts to provide versatile amplitude control of horizontal deflection circuits especially of the electromagnetic variety have been met with serious problems. Foremost of these problems is that of providing sufficient amplitude control without encountering nonlinearity in the saw tooth wave form of current passing through the deflection yoke. This problem of width control versus linearity in television deflections systems is most prominent in electromagnetic deflection systems of the direct drive type wherein the electromagnetic deflection yoke itself is placed directly in the anode cathode circuit of the deflection output amplifier.

It is therefore a purpose of the present invention to provide an improved amplitude control arrangement for cathode ray beam deflection systems.

It is another purpose of the present invention to provide a new and improved method and apparatus for controlling the deflection amplitude of electromagnetic cathode ray beam deflection systems in such a way as to maintain the deflection wave form substantially unaffected by changes in amplitude.

It is further an object of the present invention to provide a novel width control sysetm for television horizontal deflection systems which is particularly applicable to the electromagnetic direct drive reaction scanning type of deflection circuit.

In order to realize the above objects and features of advantage the present invention contemplates the use of controlled degeneration in the output stage of the cathode ray deflection system. More particularly the present invention as applied to a pentode type deflection output amplifier contemplates the use of a controlled degeneration means in the screen grid circuit of the output amplifier. An enhanced and expanded range of amplitude control is further provided by the present invention through the use of a loss controlling circuit associated with the output circuit of the deflection amplifier by properly combining and coordinating the actions of the loss controlling circuit and the controlled degeneration means. A wide range of amplitude control is made possible with negligible influence on the deflection wave form.

The present invention as particularly applied to electromagnetic cathode ray deflection systems employing screen grid type output tubes receiving deflection signal drive from a multi-vibrator type deflection signal source contemplates the use of a novel and frequency stabilizing circuit. This stabilizing circuit in accordance with the present invention comprises a frequency control means for the multivibrator which in turn is actuated or controlled by the degeneration means of the output amplifier. In this way changes in deflection amplitude have a negligible effect on the frequency of the deflection signal.

In order to more fully appreciate all the novel features of the present invention in addition to those set forth above, as well as obtain a more complete understanding of its nature and operation, reference may be made to the following description taken in connection with the accompanying drawings in which.

Figure 1:
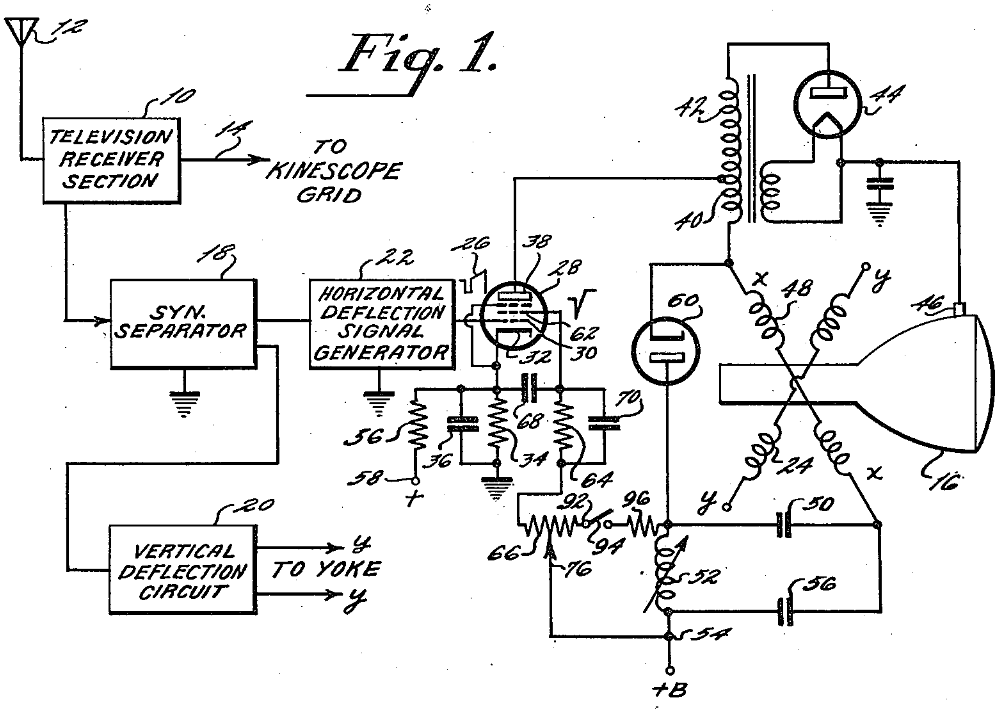
Fig. 1 is a combination block and schematic representation of one form of the present invention as applied to a television receiving circuit.

Turning now to the drawings there is shown in Fig. 1 a television receiver section 10 adapted to amplify and demodulate signals intercepted by the antenna 12. The output of the television receiver section 10 is made available at output terminal 14 for application to the grid of the image reproducing kinescope shown at 16. A portion of the demodulated signal is also made available for the synchronization pulse separator circuit 18. The separator circuit 18 delivers vertical synchronizing information to the vertical deflection circuits 20. The separator circuit 18 also provides synchronizing information to the horizontal deflection generator 22. The output of the vertical deflection circuit 20 is indicated for application to the terminals Y—Y of the deflection yoke 24 associated with the kinescope 16. The horizontal deflection signal generator 22 is by way of example illustrated as being productive of saw tooth type deflection drive wave form 26 generally found in television deflection circuits.

Typical circuit arrangements suitable for application in the block diagram representations thus far discussed may be found in an article entitled "Television Receiver" by A. R. Wright, appearing in the March, 1947 issue of the RCA Review.

The horizontal deflection amplifier of the arrangement in Fig. 1 is based primarily on the discharge tube 28. By way of example, this tube has been shown as being of the screen grid variety. The deflection signal 26 is applied to the control grid 30 of the output discharge tube. The cathode 32 of the output tube is conventionally connected with ground through the cathode resistor 34. Resistor 34 is by-passed by capacitor 36 so as to reduce degeneration in the cathode circuit. By way of example, the anode 38 of the discharge tube 28 is connected with the winding $x$—$x$ of deflection yoke 24 through a direct drive type deflection circuit employing B boost power recovery, reaction scanning action. The precise form of deflection circuit with which the output tube 28 is connected is not of importance to the successful operation of the present invention, however, the direct drive type deflection circuit has been illustrated since the problems overcome by the present invention are perhaps most prominent in this type of deflection circuit. Other types of deflection circuits which may be connected in the anode circuit of tube 28 are shown and described in an article entitled "Television Deflection Circuits" by A. W. Friend appearing in the RCA Review for March, 1947. Another article entitled "Magnetic Deflection Circuits for Cathode Ray Tubes" by Otto H. Schade appearing in the RCA Review for September, 1947 describes even another typical magnetic deflection circuit to which the present invention finds ready application.

The direct drive deflection circuit shown in Figure 1 comprises a connection from the anode 38 of discharge tube 28 to the primary of the high voltage step up transformer 40. Deflection fly-back pulses appearing across the secondary winding 42 of this transformer are rectified by the high voltage diode 44 to produce beam accelerating potential for the kinescope second anode terminal 46. The lower extremity of the primary winding on transformer 40 is then connected with the horizontal deflection yoke winding 49 of the deflection yoke. From the lower end of the deflection yoke winding a capacitor 50 is connected to the upper end of the variable linearity inductance 52. The lower end of the inductance 52 is connected to the +B power supply terminal at 54 and additional capacitor 56 is connected from the lower end of the winding 48 also to the positive power supply terminal 54. Detailed description of the operation of this circuit is described in the above identified U. S. patent application. A further description and disclosure of this circuit and its operation may be found in the RCA Service Notes on Television Receiving Models T164, TC166, TC167, and TC168, first edition dated March 10, 1950.

Briefly, the discharge tube 38 is biased by some means so that under normal operating conditions the tube 28 conducts only during the positive going extremities of the saw-tooth 26. This bias may be obtained through the use of a bleeder resistor such as 56 connected between a source of positive potential at terminal 58 and the upper end of cathode resistor 34. Such bias conditions cause a saw-tooth of current to start building up in the yoke of the winding 48 during the latter portion of the saw-tooth 26. As soon as the retrace portion of the saw-tooth occurs an oscillatory ringing starts in the winding 48. This is damped by the diode 60 to cause a saw-tooth of current to commence flowing in the yoke 48 in the opposite direction to that produced by the peak of the saw-tooth 26. By properly adjusting the bias on the tube 28 and the amplitude of the signal 26 a quite linear saw-tooth of current suitable for deflection purposes may be produced through the winding 48. The above operation is predicated upon the supply to the screen electrode 62 of a suitable positive potential as is required for conventional screen grid type tube operation.

However, according to the embodiment of the present invention shown in Figure 1, the screen electrode 62 is connected to the +B source of positive potential at terminal 54 through resistances 64 and 66. According to the present invention only the resistor 64 is completely bypassed. This is accomplished in part by capacitor 68 and in part by the capacitor 70. In further accord with the present invention the resistance 66 is made variable. The time constant of the resistor 64 with its associated capacity should be such that when resistance 66 is adjusted to be zero the time constant in the screen circuit is substantially greater than the recurrence frequency of the deflection wave form 26. Furthermore, the capacitor 70 is made large enough so that when resistor 66 is made substantially equal to zero the screen grid 62 is established at practically A. C. ground potential at signal frequencies corresponding to the deflection wave form. That is to say, the capacitor 70 is made large enough to offer a very low impedances path to deflection signal components. Under such conditions, that is with resistance 66 equal to zero, the deflection circuit will operate in a somewhat conventional manner and will produce maximum deflection amplitude. Linearity of the wave form under such conditions may be adjusted by varying the value of inductance 52.

According to the present invention, if it should be desired to reduce the amplitude of deflection wave form, the tap 72 on resistance 66 is moved to the right so that both an accelerating and a D. C. voltage drop will occur across the resistance 66. Since resistance 66 is not completely bypassed, this accelerating voltage drop will produce screen grid degeneration. The effects of introducing screen grid degeneration in this manner may be illustrated by the graphical curve of Figure 2.

Figure 2:
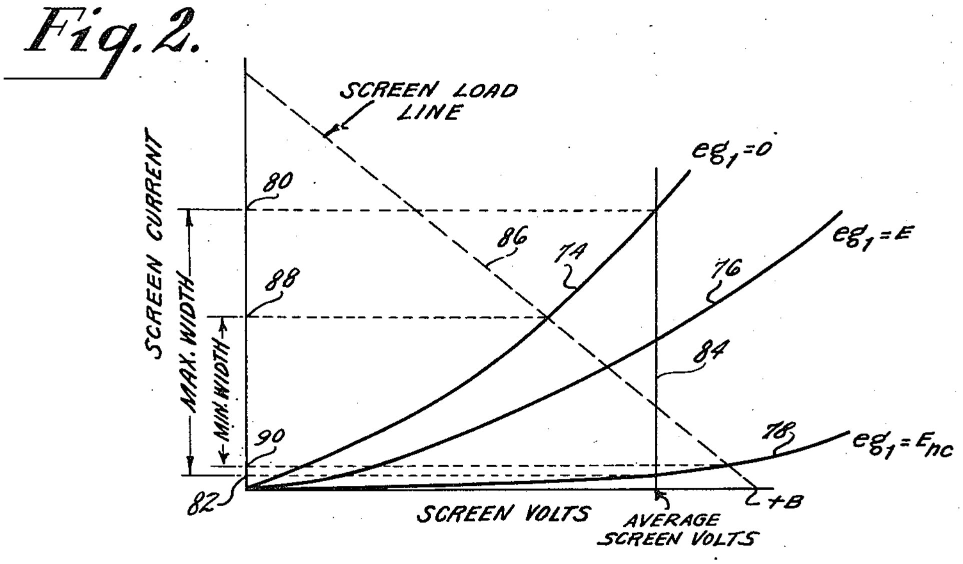
Fig. 2 is a graphical representation of certain characteristics peculiar to the novel operation of the present invention.

The graph of Figure 2 shows a plot of screen current versus screen voltage of tube 28 for various control grid-cathode voltages. Three such curves are shown at 74, 76 and 78, respectively. Curve 74 depicts the screen current versus screen voltage characteristic for a control grid-cathode potential of zero volts. Curve 76 shows the characteristic for a control grid-cathode voltage equal to some nominal value E. Curve 78 illustrates the screen characteristics of the tube for a control grid-cathode voltage which is sufficiently negative to establish cutoff in the tube. This value of voltage is indicated as $E_{NC}$ referring to non-conduction in the tube. With the resistance 66 equal to zero virtually no A. C. impedance is imposed in the screen grid circuit so that a deflection drive wave form such as 26, which is of sufficient amplitude to drive the control grid from zero volts to $E_{NC}$, will produce a screen current variation which is indicated by the vertical distance between points 80 and 82 on the ordinate of the graph in Figure 2. This zero impedance condition as stated before, corresponds to the maximum deflection amplitude producible by the circuit and may be referred to as maximum width. It is, of course, understood that the vertical line 84 corresponds to the average D. C. screen voltage. The difference between this average value and +B represents the D. C. voltage drop across the resistor 64.

Should now, still looking at Figure 2, the resistance 66 be given some finite value the screen voltage fluctuations will be defined by some load line such as 86. The slope of the load line 86 will be made to correspond to the actual resistance 66 as well known in the art of graphically analyzing vacuum tube operating characteristics. Under such conditions the same given amplitude of deflection drive by the wave form 26 will still produce a control grid voltage change from zero to $E_{NC}$. However, now the resulting screen grid current fluctuations will be much less than before and may be indicated by the vertical distance between point 88 and 90 on the ordinate of the graph in Figure 2. This has been arbitrarily indicated as being the screen voltage variation corresponding to minimum width. Since plate current fluctuations are a function of screen current changes in a pentode it is clear that changing the value of resistance 66 will produce similar changes in the amplitude of actual yoke deflection current.

It is of importance to note that although in the prior art degeneration has been employed to control the amplitude of deflection produced by vacuum tubes nowhere in the prior art has controlled degeneration been employed in the screen grid circuit of a pentode. The method of control provided by the present invention is advantageous since the degeneration imposed does not alter the effective drive to the discharge tube 28. As well known by those familiar with deflection circuits, changing the effective drive to a reaction scanning type circuit causes noticeable changes in the linearity of the resulting deflection. In the present invention, however, the effective control grid versus cathode voltage fluctuations or drive remains constant and hence changes in the linearity of deflection current are minimized.

In still further accordance with the present invention a greater range of amplitude control may be obtained by carefully controlling the losses in the reaction scanning deflection circuit during the control of degeneration in the screen grid circuit. Whereas prior art attempts to control deflection amplitude by adjusting losses in the reaction scanning circuit have been successful to a degree, the range of such control has been limited by the resulting deflection wave form distortion when circuit losses were made too high. According to the present invention, however, by properly introducing the correct amount of degeneration in the screen grid circuit it is possible to realize an increase in the amount that deflection amplitude may be usefully reduced by applying losses in the reaction scanning circuit. This synchronized action of imposing circuit losses and degeneration may be accomplished by the convenient arrangement shown in Figure 1. Here the resistance 66 is a portion of potentiometer. The right hand end 92 of the potentiometer may be connected through the switch 94 to resistance 96. The right hand extremity of resistance 96 is in turn connected to the upper end of inductance 52. With the switch 94 closed the inductance 52 is fully shunted by a variable resistance whose value may be adjusted by positioning the potentiometer arm 76.

Operation of the present invention in this regard is substantially as follows: As the arm 76 is moved to the right in Figure 1 an increased amount of degeneration is imposed in the screen grid circuit. At the same time the inductance 52 is shunted by a lower value of resistance. This increases circuit losses in the reaction scanning system and, therefore, reduces the efficiency thereof. This results in a reduced amplitude of deflection. As pointed out above, the increased degeneration also produces a further decrease in the amplitude of deflection. This compound control is not aggregative in nature since, as pointed out above, a wave form compensating influence is involved.

Figure 3:
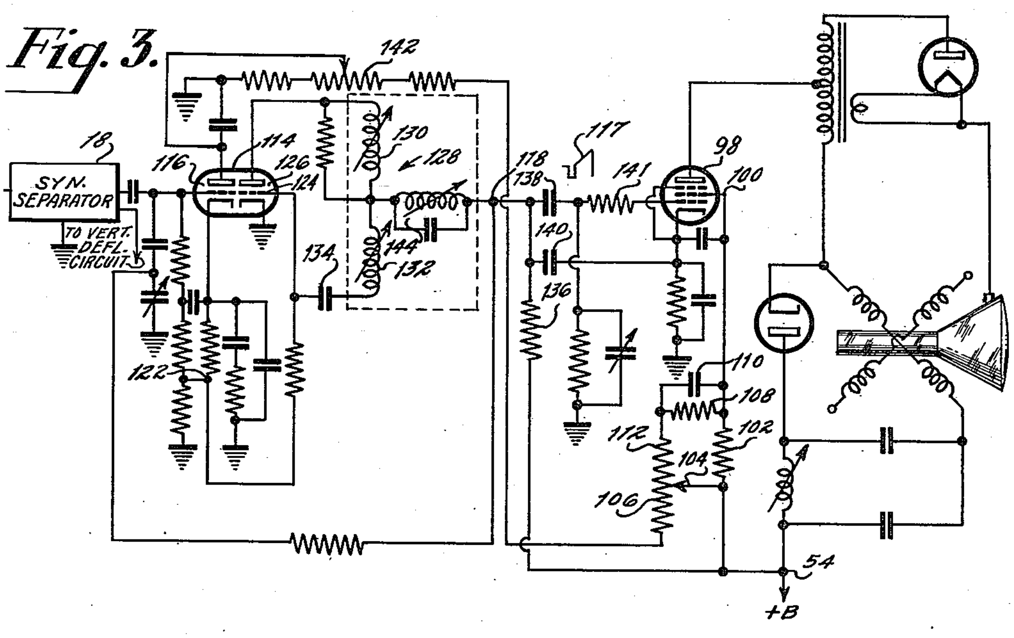
Fig. 3 is a combination block and schematic representation of another form of the present invention as applied to a television type deflection circuit.

The embodiment of the present invention shown in Figure 3 is in some aspects similar to that shown in Figure 1. The same type of direct drive reaction scanning circuit is shown in Figure 3 as was indicated in Figure 1. Here, however, the output tube 98 has its screen electrode 100 supplied with bias through a somewhat different configuration of variable impedance from that shown in Figure 1. Here the screen grid 100 is connected with +B potential at 54 through two resistance paths. The first path comprises resistance 108 in series with resistance 112. The second path comprises resistance 102. With the tap arm 104 of the potentiometer 106 moved to the upper extremity of potentiometer resistance a minimum resistance is imposed in series with the screen grid circuit. This resistance comprises the parallel combination of resistance 108 and resistance 102. Capacitor 110 is made sufficiently large under these conditions so as to heavily bypass the resulting resistive impedance. Now, as the tap 104 is lowered on the potentiometer 106 an unbypassed resistance 112 comes into the picture. This imposes degeneration in the circuit and causes a reduction in deflection amplitude as was the case in Figure 1.

The arrangement in Figure 3 further differs from that of Figure 1 in the following respect. Figure 3 indicates that the pentode 98 is being driven by a multivibrator type of sawtooth deflection wave form generator. This generator is of the time averaging type and is based on the dual triode 114. The first section 116 of the dual triode 114 operates as a timing comparator circuit so as to compare the incoming signal from the synchronizing pulse separator 18 with the developed saw-tooth 117 appearing at terminal 118. The resulting signal comparison produces a control voltage at terminal 122 of the cathode circuit of triode 116. Terminal 122 is connected to the grid 124 of the second triode section 126. Triode 126 is further connected to operate as a blocking oscillator type saw-tooth generator. Thus, as the incoming synchronizing pulse signal is compared in time with the resulting saw-tooth appearing at terminals 118 the bias on the triode section 126 is established to provide the proper operating frequency for the blocking oscillator saw-tooth generator. The feed-back transformer for the blocking oscillator is shown at 128. Its primary 130 is connected in the anode circuit of triode 126 while its secondary 132 is connected in shunt with the grid circuit of the triode 126 through capacitor 134. Positive potential for the anode of the triode 126 is supplied through the resistance 136 connected with a source of +B potential at terminal 54. The saw-tooth discharge capacitors 138 and 140 are connected with the upper end of the resistor 136. The saw-tooth developed across these capacitors is applied to the grid of the output tube 98 through a small resistor 141.

The particular form of time averaging saw-tooth deflection generator shown in Figure 3 as a source of driving signal for the output tube 98 and is of the general type shown and described in U. S. application 136,021 filed December 30, 1949, by Simeon I. Tourshou entitled "Beam Deflection Control for Cathode Ray Devices." A full description and operation of this type of signal deflection generator is also to be found in the January, 1950, issue of the Radio and Television News in an article entitled "A Single Tube A. F. C. Circuit for TV Deflection Systems" by John A. Cornell commencing on page 58. According to these references the anode potential of the triode section 116 is made manually variable by means of a potentiometer such as 142 so that a manual control of the deflection generator frequency may be had. In such applications the right end extremity of the potentiometer 142 was connected with a fixed source of positive B potential. Thus, as the value of the anode potential of the triode 116 was changed the potential appearing at 122 changed and the bias on the blocking oscillator triode 186 was altered. This, of course, caused a frequency change.

According to the present invention the right hand terminal of potentiometer 142 instead of being connected to a fixed source of positive potential, it is connected to the lower extremity of potentiometer 106 associated with the above described reaction scanning circuit. The following operation is obtained: When the degeneration control tap 104 is moved downwardly along potentiometer 106 the degeneration in the screen grid circuit of tube 98 is increased as disclosed before. This degeneration reduces the effectiveness of screen grid 100 to shield the anode from the control grid of the pentode 98. Due to the well-known Miller effect this increases the effective grid-to-cathode capacitance of the pentode 98. Such an increase is effectively in shunt with the saw-tooth charging capacitor associated with blocking oscillator 126. The time constant of the blocking oscillator will therefore be increased. This will tend to reduce the frequency of the blocking oscillator. However, in accordance with the present invention, the aforementioned movement of the tap 104 downwardly to increase degeneration has increased the potential applied to the anode of triode 116. This will cause the terminal 122 to become more positive and apply a more positive bias to the grid of the blocking oscillator triode 126. As well known by those familiar with blocking oscillator action, this increase in positive bias will tend to increase the frequency of the blocking oscillator and therefore tend to compensate for the increased Miller effect capacity imposed by the pentode 98. The parallel resonant circuit 144 connected in series with the anode circuit of the triode 126 acts as a further stabilizing influence on the blocking oscillator frequency as described in the above mentioned U. S. patent application 136,021 and Radio Television News article. The resonant circuit 144, of course, forms no part of the present invention.

It is to be understood that the novel frequency correcting action of the present invention is not limited to the preferred form of signal generator shown in Figure 3. For example, in Figure 4 a very basic type of blocking oscillator saw-tooth generator is indicated. No means are provided for time averaging frequency control of the blocking oscillator by comparison of received synchronizing pulses with developed saw-tooth. However, in Figure 4, the triode 146 due to the action of the transformer 148 and grid time constant afforded by capacitor 152 and resistor 154 sustains periodic blocking oscillator operation. Saw-tooth capacitor 156 charges substantially linearly through changing resistor 158 during non-conduction of the blocking oscillator tube 146. During conduction of the tube 146, however, the capacitor 156 is discharged. This charging and discharge produces the conventional saw-tooth wave form shown at 160. Such a blocking oscillator saw-tooth generator is shown and described in the above article "Television Deflection Circuits" by A. W. Friend appearing in the RCA Review for March, 1947. As well known by those skilled in the television art the frequency of the blocking oscillator 146 is dependent upon the value of +B voltage applied to the circuit. The higher the +B voltage applied to the circuit the higher will be the anode voltage applied to the triode 106. This will cause the tube 146 to reflect a higher mutual conductance which will result in greater peak charging of the grid circuit R. C. combination. This of course will decrease the effective operating frequency of the blocking oscillator.

Figure 4:
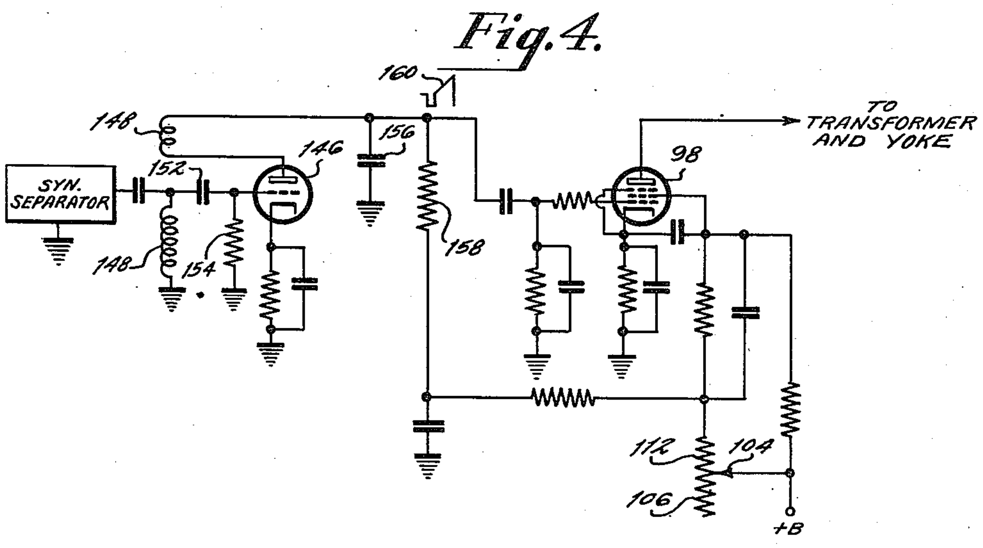
Fig. 4 is a further modification of the present invention as applied to a typical cathode ray beam deflection circuit.

In accordance with the present invention the output pentode 98 in Figure 4 is connected substantially in the same manner shown in Figure 3 to provide variable screen grid degeneration control. Thus, in Figure 4, as the tap 104 is moved downwardly on the potentiometer element 106, the degeneration in the screen grid circuit of the tube 98 is increased. As described above this increases the effective Miller capacity in shunt with the saw-tooth capacitor 106 and lowers the frequency of the multi-vibrator. However, as the tap 104 is moved downwardly on the potentiometer 106, the D. C. voltage drop across the resistance section 112 becomes greater and the anode voltage applied to the blocking oscillator triode is decreased. As indicated above, this tends to increase the frequency of blocking oscillator 146 and hence compensate for the increase in Miller capacity produced by increased degeneration.

From the foregoing, it can be seen that the applicant has provided a new and useful width control arrangement for cathode ray beam deflection systems. It will be appreciated that although the present invention has been described in conjunction with electromagnetic type deflection systems, its principle can be applied with advantage to electrostatic type deflection systems as well. Moreover, the novel frequency correcting action of the present invention, as shown herein, although illustrated in connection with blocking oscillator type saw-tooth deflection circuits, may be, of course, applied to other types of deflection signal sources whose frequency of operation may be controlled by altering circuit operating potentials.

What is claimed is:

1. In an electromagnetic cathode ray deflection system employing a deflection yoke in combination, a source of deflection signal, an output tube having at least an anode, cathode control electrode and supplementary electrode interposed between said anode and said control electrode, connections for applying the output of said deflection signal source to said control electrode, an output circuit connected between said anode and said cathode, said output circuit including means for coupling electrical variations developed therein to the deflection yoke, a source of positive biasing potential having its negative terminal connected with said output tube cathode, an impedance having a resistive component connected between said supplementary electrode and the positive circuit of said biasing potential source whereby to introduce degeneration in the deflection system, a capacitor connected in shunt with at least a portion of said impedance to form a time constant combination, and means for varying the value of the time constant of said time constant combination such as to control the amount of degeneration present in said system.

2. Apparatus according to claim 1 wherein said discharge tube is of the pentode variety and wherein said first and second control electrodes are respectively the control grid and screen grid of said pentode.

3. In an electromagnetic cathode ray deflection system employing a deflection yoke in combination, a source of deflection signal, an output tube having at least an anode, cathode control electrode and supplementary electrode interposed between said anode and said control electrode, connections for applying the output of said deflection signal source to said control electrode, an output circuit connected between said anode and said cathode, said output circuit including means for coupling electrical variations developed therein to the deflection yoke, a source of positive biasing potential having its negative terminal connected with said output tube cathode, a reactance connected between said supplementary electrode and the positive terminal of said biasing potential source, a capacitor connected in shunt with at least a portion of said reactance to form a time constant circuit, and means for varying the value of said resistance whereby to concomitantly vary the time constant of said time constant circuit as well as the direct current potential reaching said intermediate electrode.

4. In an electromagnetic cathode ray deflection system employing a deflection yoke in combination, a source of deflection signal having a predetermined period of recurrence, an output tube having at least an anode, cathode control electrode and supplementary electrode interposed between said anode and said control electrode, connections for applying the output of said deflection signal source to said control electrode, an output circuit connected between said anode and said cathode, said output circuit including means for coupling electrical variations developed therein to the deflection yoke, a source of positive biasing potential having its negative terminal connected with said output tube cathode, a variable resistance connected between said supplementary electrode and the positive terminal of said biasing potential source said resistance being variable between a high and low limit, a capacitor connected in shunt with at least a portion of said resistance to form a time constant circuit the value of said capacitor being such that the time constant value of said time constant circuit is not substantially greater than the recurrence period of said deflecting signal when said variable resistance is at its high limit.

5. Apparatus according to claim 4 wherein said output tube is of the pentode variety and wherein said supplementary electrode is the screen electrode of said pentode.

6. In an electromagnetic cathode ray deflection system employing a deflection yoke in combination, a source of deflection signal having a predetermined frequency, an output tube having at least an anode, cathode control electrode and supplementary electrode interposed between said anode and said control electrode, connections for applying the output of said deflection signal source to said control electrode, an output circuit connected between said anode and said cathode, said output circuit including means for coupling electrical variations developed therein to the deflection yoke, a source of positive biasing potential having its negative terminal connected with said output tube cathode, a resistance connected between said supplementary electrode and the positive terminal of said bias source to form a supplementary electrode circuit, a capacitor connected in shunt with at least a portion of said resistance, the value of said capacitor being so related to the deflection signal frequency and the value of the resistance across which it is shunt connected that a degree of degeneration is produced in the supplementary electrode circuit, and means for concomitantly varying both the degree of supplementary electrode circuit degeneration so produced along with the value of potential applied to said supplementary electrode.

7. In an electromagnetic cathode ray deflection system employing a deflection yoke in combination, a source of deflection signal, an output tube having at least an anode, cathode control electrode and supplementary electrode interposed between said anode and said control electrode, connections for applying the output of said deflection signal source to said control electrode, an output circuit connected between said anode and said cathode, said output circuit including means for coupling electrical variations developed therein to the deflection yoke, a source of positive biasing potential having its negative terminal connected with said output tube cathode, means for applying said positive bias source to said supplementary electrode, means to produce degeneration in said output tube, and means for concomitantly varying both the value of bias potential applied to said supplementary electrode by said applying means and the degree of degeneration produced by said degeneration means.

8. Apparatus according to claim 7 wherein said varying means is so arranged that the amount of degeneration produced by said degeneration means is inversely proportional to the magnitude of voltage applied to said supplementary electrode.

9. In a reaction scanning electromagnetic cathode ray beam deflection system employing a deflection yoke having in shunt across its winding a damping tube, the combination of a source of deflection signal, an output tube having at least an anode, cathode control electrode and supplementary electrode interposed between said anode and said control electrode, connections for applying the output of said deflection signal source to said control electrode, an output circuit connected between said anode and said cathode, said output circuit including means for coupling electrical variations developed therein to the deflection yoke, a source of positive biasing potential having its negative terminal connected with said output tube cathode, an impedance having a resistive component connected between said supplementary electrode and the positive circuit of said biasing potential source whereby to introduce degeneration in the deflection system, a capacitor connected in shunt with at least a portion of said impedance to form a time constant combination, an inductance connected in series with the shunt connections of the damping tube across the yoke winding, resistance means connected in shunt with said inductance, and means for concomitantly varying both the time constant of said time constant combination and the value of said resistance means whereby to control the amplitude of deflection signal applied to said deflection yoke.

10. In a reaction scanning electromagnetic cathode ray beam deflection system employing a deflection yoke having in shunt across its winding a damping tube, the combination of a source of deflection signal, an output tube having at least an anode, cathode control electrode and supplementary electrode interposed between said anode and said control electrode, connections for applying the output of said deflection signal source to said control electrode, an output circuit connected between said anode and said cathode, said output circuit including means for coupling electrical variations developed therein to the deflection yoke, a source of positive biasing potential having its negative terminal connected with said output tube cathode, means for applying said positive bias source to said supplementary electrode, means to produce degeneration in said output tube, an inductance connected in series with the shunt connection of the damping tube across the yoke winding, resistance means connected in shunt with said inductance, and means for varying the following three entities simultaneously first the value of bias potential applied to said supplementary electrode by said applying means, second the degree of degeneration produced by said degeneration means and third the value of said resistance means whereby to obtain versatile control of the amplitude of deflection signal applied to said deflection yoke.

11. Apparatus according to claim 10 wherein said source of deflection signal comprises a self excited multivibrator circuit having as part of its output circuit a sawtooth discharge capacitor where value defines in part the frequency of said multivibrator.

12. In an electromagnetic deflection circuit for exciting the winding of a deflection yoke the combination of, an electron discharge tube having at least an anode, cathode, first control electrode and a second control electrode, means for applying a deflection signal between said discharge tube first control electrode and said cathode, an output circuit for said discharge tube connected between the anode and cathode thereof, connections for driving the deflection yoke winding from signal energy developed in said output circuit, a source of biasing potential having its negative terminal connected with said discharge tube cathode and its positive terminal connected with said discharge tube second control electrode, a degenerative network serially included in said connection to said second control electrode, and means for varying the amount of degeneration produced by said degenerative network whereby to control the amplitude of deflection produced by said discharge tube.

13. A cathode ray beam deflection system employing an electromagnetic deflection yoke in combination, a deflection signal source having output terminals, the frequency of the deflection signal provided by said deflection source being a function of the electrical capacity imposed across said output terminals, an electron discharge tube having at least an anode, cathode and control electrode, connections applying the output terminals of said deflection signal source between the control electrode and cathode for said discharge tube, an output circuit connected between the said discharge anode and cathode, said output circuit including means for coupling electrical energy to said yoke, means for varying the frequency of deflection signal developed by said deflection signal source, controllable means for imposing degeneration in said electron discharge tube and coupling means connected between said frequency varying means and said controllable means.

14. Apparatus according to claim 13 wherein said electron discharge tube is of the screen variety and wherein said controllable degeneration means is connected in the screen grid circuit of said discharge tube and wherein said coupling means comprises a connection from said discharge tube screen grid to said frequency varying means.

15. Apparatus according to claim 14 wherein said source of deflection signals is a multivibrator type sawtooth wave form generator having the saw tooth discharge capacitor in shunt with said output terminals.

16. An electromagnetic deflection circuit for exciting the winding of an electromagnetic deflection yoke, a combination of an electron discharge tube amplifier having a screen grid, an input circuit and an output circuit, controllable circuit means connected to said screen grid for producing degeneration in said discharge tube amplifier, means for coupling the deflection yoke winding with said amplifier output terminals to form an output load for the amplifier, means for controlling the loss in said load, said loss controlling means and said degeneration controlling being adapted to work in synchronism with one another.

SIMEON I. TOURSHOU.

REFERENCES CITED

The following references are of record in the file of this patent:

UNITED STATES PATENTS

| Number | Name | Date |
|---|---|---|
| 2,098,390 | Iams | Nov. 9, 1937 |
| 2,284,378 | Dome | May 26, 1942 |
| 2,436,447 | Packard | Feb. 24, 1948 |
| 2,440,786 | Schade | May 4, 1948 |
| 2,443,030 | Foster | June 8, 1948 |
| 2,466,784 | Schade | Apr. 12, 1949 |
| 2,470,197 | Torsch | May 17, 1949 |
| 2,482,150 | Bocciarelli | Sept. 20, 1949 |
| 2,510,670 | Trott | June 6, 1950 |
| 2,536,838 | Clark | Jan. 2, 1951 |
| 2,536,839 | Clark et al. | Jan. 2, 1951 |
| 2,536,857 | Schade | Jan. 2, 1951 |
| 2,543,719 | Clark | Feb. 27, 1951 |